US009805880B2

(12) United States Patent
Warren et al.

(10) Patent No.: US 9,805,880 B2
(45) Date of Patent: Oct. 31, 2017

(54) FABRICATION OF ENHANCED SUPERCAPACITORS USING ATOMIC LAYER DEPOSITION OF METAL OXIDE ON NANOSTRUCTURES

(71) Applicants: Masdar Institute of Science and Technology, Abu Dhabi (AE); The Regents of the University of California, Oakland, CA (US)

(72) Inventors: Roseanne Warren, Berkeley, CA (US); Firas Sammoura, San Jose, CA (US); Liwei Lin, San Ramon, CA (US)

(73) Assignee: Masdar Institute of Science and Technology (AE)

( * ) Notice: Subject to any disclaimer, the term of this patent is extended or adjusted under 35 U.S.C. 154(b) by 134 days.

(21) Appl. No.: 14/602,104

(22) Filed: Jan. 21, 2015

(65) Prior Publication Data
US 2015/0303001 A1    Oct. 22, 2015

Related U.S. Application Data

(60) Provisional application No. 61/930,917, filed on Jan. 23, 2014.

(51) Int. Cl.
*H01G 11/46* (2013.01)
*H01G 11/04* (2013.01)
(Continued)

(52) U.S. Cl.
CPC .............. *H01G 11/46* (2013.01); *C25D 11/26* (2013.01); *C25D 11/34* (2013.01); *H01G 11/36* (2013.01);
(Continued)

(58) Field of Classification Search
CPC ........................................................ H01G 9/00
See application file for complete search history.

(56) References Cited

U.S. PATENT DOCUMENTS 7,381,658 B2    6/2008    Mardilovich et al.
7,858,213 B2    12/2010   Tsai et al.
(Continued)

FOREIGN PATENT DOCUMENTS

WO    2013163259 A2    10/2013

OTHER PUBLICATIONS

Kim, Woo-Hee et al, "Atomic Layer Deposition of Ruthenium and Ruthenium-oxide Thin Films by Using a Ru(EtCp)2 Precursor and Oxygen Gas", Journal of the Korean Physical Society, vol. 55, No. 1, Jul. 2009, pp. 32-37.
Aaltonen, Titta et al, "Ruthenium Thin Films Grown by Atomic Layer Deposition", Chemical Vapor Deposition 2003, 9, No. 1, pp. 45-49.
(Continued)

*Primary Examiner* — Seahvosh Nikmanesh
(74) *Attorney, Agent, or Firm* — Grossman Tucker Perreault & Pfleger PLLC

(57) ABSTRACT

A method to a fabricate high surface area, high performance supercapacitor includes include applying a metal layer to at least a portion of a nanostructure; after applying the metal layer, oxidizing the metal layer; applying a plurality of additional metal layers onto a previously oxidized metal layer; and after applying each additional metal layer, oxidizing the additional metal layer prior to applying a successive additional metal layer. The metal layers may include a composition comprising at least one metal, the at least one metal selected from the group consisting of ruthenium, titanium, manganese, vanadium, iron, tin, cobalt and nickel. Optionally, each of the additional metal layers may be applied using atomic layering deposition (ALD).

24 Claims, 12 Drawing Sheets

(a)                     (b)                     (c)

(51) Int. Cl.
  *H01G 11/86* (2013.01)
  *C25D 11/26* (2006.01)
  *C25D 11/34* (2006.01)
  *H01G 11/36* (2013.01)

(52) U.S. Cl.
  CPC ............ *H01G 11/86* (2013.01); *H01G 11/04* (2013.01); *Y02E 60/13* (2013.01)

(56) References Cited

U.S. PATENT DOCUMENTS

| | | | |
|---|---|---|---|
| 8,599,533 | B2 | 12/2013 | Haight et al. |
| 2010/0266897 | A1 | 10/2010 | Lee et al. |
| 2015/0303001 | A1* | 10/2015 | Warren .................. C25D 11/26 361/502 |

OTHER PUBLICATIONS

Sun, Xiang et al, "Atomic Layer Deposition of TiO2 on Graphene for Supercapacitors", Journal of the Electrochemical Society, 159 (4), Jan. 19, 2012, pp. A364-A369.

Boukhalfa, Sofiane et al, "Atomic Layer Deposition of Vanadium Oxide on Carbon Nanotubes for High-Power Supercapacitor Electrodes", Energy Environ. Sci., 5, 2012, pp. 6872-6879.

Jiang, Yingqi et al, "Uniformly Embedded Metal Oxide Nanoparticles in Vertically Aligned Carbon Nanotube Forests as Pseudocapacitor Electrodes for Enhanced Energy Storage", NANO Letters, American Chemical Society 2013, pp. 3524-3530.

Warren, Roseanne et al, "ALD Ruthenium Oxide-Carbon Nanotube Electrodes for Supercapacitor Applications", MEMS-14, Manuscript 0042, Nov. 25, 2013, pp. 1-4.

English language International Search Report/Written Opinion mailed Apr. 17, 2015, received in corresponding PCT Application No. PCT/US15/12290, 10 pgs.

* cited by examiner

FABRICATION OF ENHANCED SUPERCAPACITORS USING ATOMIC LAYER DEPOSITION OF METAL OXIDE ON NANOSTRUCTURES

CROSS-REFERENCE TO RELATED APPLICATIONS

The present application claims the benefit of U.S. Provisional Patent Application Ser. No. 61/930,917 filed Jan. 23, 2014, which is fully incorporated herein by reference.

BACKGROUND

Supercapacitors are electrochemical energy-storage devices that store charge by reversible adsorption of ions onto high-surface area, porous materials (known as "electric double layer capacitors") or reversible surface reduction-oxidation (redox) reactions (known as "pseudo-capacitors"). With their high power density and long cycle stability, supercapacitors are well-suited to complement or replace batteries in a wide range of applications, including transportation, renewable energy, and portable electronics. High-performance supercapacitors are characterized by high specific capacitance, good stability over repeated cycling, and low series resistance.

BRIEF DESCRIPTION OF THE DRAWINGS

The present disclosure will be more fully understood by reference to the following drawings which are for illustrative purposes only.

DETAILED DESCRIPTION

Supercapacitors are electrochemical energy storage devices with promising applications in many environmentally-friendly technologies—including renewable energy and electric vehicles—that require high power density and high cycle life energy storage.

In the present embodiments, high performance supercapacitors employed high surface area electrodes coated with a thin film of active pseudocapacitive material, such as metal oxides or conductive polymers. Examples of metal pseudocapacitive materials that store charge by a similar mechanism include ruthenium oxide ($RuO_x$), manganese oxide ($MnO_2$), vanadium oxide ($V_2O_5$), mixed cobalt-nickel oxides (a-$(Co+Ni)(OH)_2 \cdot nH_2O$), cobalt oxide ($Co_3O_4$), cobalt hydroxide ($Co(OH)_2$), nickel oxide (NiO), tin oxide ($SnO_2$), iron oxides ($Fe_2O_3$ and $Fe_3O_4$), and titanium dioxide ($TiO_2$). Non-metal pseudocapacitive materials include polyaniline, polypyrrole, and polythiophene.

The coated "pseudocapacitive" electrodes store charge by reversible reduction-oxidation (redox) reactions. In one embodiment of a pseudocapacitive material reaction, the ruthenium oxide ($RuO_x$) reaction is one of the highest performing pseudocapacitive materials due to its fast, reversible redox reactions:

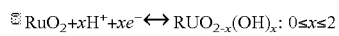
$$RuO_2 + xH^+ + xe^- \leftrightarrow RuO_{2-x}(OH)_x: \ 0 \leq x \leq 2$$

As shown above, $RuO_x$ supercapacitors intercalate positive ions ($H^+$) during charging; it is obligatory to have good proton and electron conductivity within the $RuO_x$ lattice for high supercapacitor performance. In pseudocapacitive materials, the supercapacitor performance depends on the hydroxyl content of the oxide, with hydrated, amorphous oxides often displaying better charge storage as a result of higher proton and more electrochemically active redox sites.

To achieve high specific capacitance, fabrication methods must provide precise control of electrode structure and chemical composition as well as good uniformity over high surface areas.

One supercapacitor fabrication method uses solution-based deposition, such as $RuO_x$. For example, $RuO_x$ supercapacitor fabrication method using solution-based deposition of ruthenium trichloride exhibited a lack of uniformity and control of the $RuO_x$ coating. Other fabrication methods include magnetic sputtering and electro-oxidation of Ru nanoparticles, and mixing of $RuO_2$-$xH_2O$ particles with a polymer binding agent. These methods suffer from poor electronic conductivity (especially for polymer binding agents), low utilization of $RuO_x$ due to non-uniformly dispersed nanoparticles or films, and/or low proton conductivity due to poor hydration.

Figure 1:
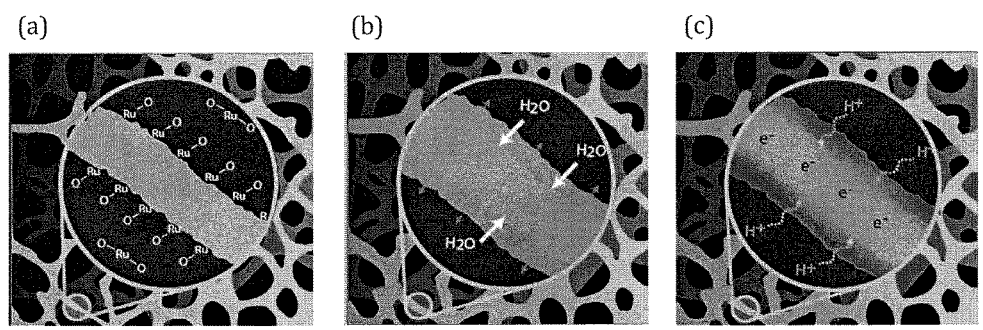
FIG. 1 Conceptual illustration of ALD $RuO_x$ supercapacitor fabrication and energy storage mechanism.

According to one embodiment of the present disclosure, a novel method was invented based on atomic layering deposition (ALD) to fabricate supercapacitors that had highly uniform, conformal coating of pseudocapacitive materials, which was applied to a diversity of surface compositions and structures. Three such embodiments included planar, vertically-aligned carbon nanotubes (CNT) and porous silicon (Si) electrodes. A further embodiment was the use of post-ALD electrochemical oxidation to increase energy storage potential. This method is the first successful direct ALD coating of $RuO_2$ onto porous electrodes for supercapacitor applications, including CNTs and porous silicon one monolayer at a time. This method allows precise control over the $RuO_2$ layer thickness and composition without the use of binder molecules In FIG. 1, a conceptual illustration of the general method for ALD supercapacitor fabrication process and charge storage mechanism of the hydrated coating is shown depicting a metal oxide, using $RuO_x$ as an example, onto porous structure. ALD is a highly versatile deposition process can be applied to any porous, high surface area, or high aspect ratio nanostructure, provided that the pores are accessible to the gas-phase precursors. In FIG. 1a, a generic porous structure is coated with ALD $RuO_x$ by sequential pulsing of an organometallic ruthenium precursor and oxygen. In FIG.

1b, the as-deposited ALD $RuO_x$ film is electrochemically oxidized to produce a hydrated pseudocapacitive layer with high proton conductivity. In FIG. 1c, the electrochemical energy storage mechanism of the hydrated ALD $RuO_x$ film is shown, which switches reversibly between oxide and hydroxide states through intercalation of hydrogen ions. In the electrode design, the surface and near-surface charge storage mechanism of the $RuO_x$ layer enables rapid charging and discharging of the supercapacitor, while the high surface area, porous electrode structure increases power and energy density.

Figure 2:
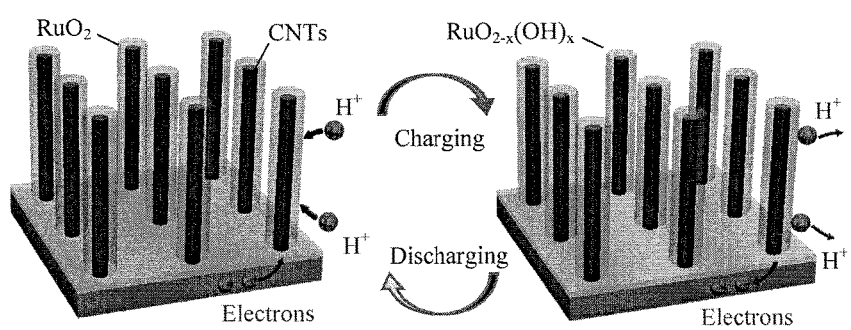
FIG. 2 Conceptual view of a forest of vertically-aligned CNTs is covered with a layer of $RuO_2$.
Figure 2:
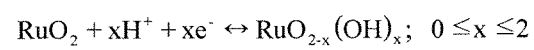

Another embodiment of different structure used is shown in FIG. 2, where ALD metal oxide coated carbon nanotube (CNT) is illustrated during charging and discharging. In the illustration, forest of vertically-aligned CNTs is covered with a layer of $RuO_2$ several nanometers thick deposited by ALD. The CNT provides a dynamic structure that can be varied and has exceptional high surface area, conductive, and flexible support for the active layer $RuO_2$. As the device charges, the active $RuO_2$ layer absorbs protons from the electrolyte and electrons flow into the device from an external circuit as the $RuO_2$ layer is converted to $Ru(OH)_2$ by a surface redox reaction. When discharging, stored electrons flow out of the device to an external circuit and protons are released into the electrolyte as $Ru(OH)_2$ is converted back to $RuO_2$ in the reverse redox reaction. In this device, the high strength and mechanical flexibility of the CNT forest is important for relieving mechanical stresses in the $RuO_2$ layer that arise from repeated cycling through redox states.

In some of the following embodiments to fabricate supercapacitors, a novel, high precision, thin-film deposition method using atomic layer deposition (ALD) and precursors is described that provides uniform, conformal coating of large surface area, diverse nanomaterials. In addition, further embodiments employed the use of post-ALD electrochemical oxidation to enhance energy storage potential. Electrochemically oxidized ALD metal oxide supercapacitors prepared had exceptional high values of specific capacitance (644 F/g), power density (17 kW/kg), and energy density (4 Wh/kg). In view of prior methods, their supercapacitor performance was maintained over 10,000 charge-discharge cycles, and at ultra-high scan rates of up to 20 V/s.

Example 1: Diverse Substrate Nanostructures for Supercapacitor Fabrication Using ALD In some of the following embodiments using atomic layer deposition, metal oxide was successfully coated in a uniform, conformal application onto diverse porous electrodes composed of different nanostructures and different materials that previously were extremely difficult to fabricate. In one demonstration the porous materials was made from vertically aligned carbon nanotubes (CNT) while in the two other demonstrations planar and porous silicon was used as the starting electrode materials.

In one embodiment of a structure on which a metal oxide is deposited was a forest of vertically-aligned carbon nanotubes (CNT) grown on molybdenum- and oxide-coated silicon wafer. In this embodiment, vertically aligned CNTs were synthesized by chemical vapor deposition on silicon substrates in a horizontal tube furnace as described by Jiang et al., *Nano Lett.* 13, 3524 (2013). Briefly, silicon substrates were cleaned in piranha solution, then coated with 100 nm thermal oxide and 50 nm molybdenum by electron beam evaporation. Iron and aluminum catalyst layers (10 nm and 5 nm, respectively) were then deposited by thermal evaporation. CNTs were grown at 720° C. and atmospheric pressure in a horizontal tube furnace in a mixture of 7:1 hydrogen-to-ethylene gas. A growth time of 10 minutes gave average CNT heights of 10 μm. Other CNT heights can also prepared by varying the growth times.

In another embodiment, planar and porous silicon (Si) wafers were used for deposition.

In yet other embodiments, substrate structure is linear, non-linear, planar or porous structures made of carbon, silicon, graphene, activated carbon, phosphorene, or like materials that may be coupled to the conductive substrate. The highly versatile deposition process was applied to any structures that are porous, high surface area, or high aspect ratio nanostructure, provided that the pores are accessible to the gas-phase precursors. Embodiments include carbon, silicon, phosphorene, or like materials are oriented substantially perpendicular such as nanotubes, single or multi-walled nanotubes, nanowires, nanorods, aggregated nanoparticles, fibers, ribbons, or other structures. Other embodiments include substrate scaffolds that are porous structures and made of carbon, silicon, phosphorene, or materials with similar properties.

Example 2: ALD Layering of a Metal Oxide onto Carbon Nanotubes Structures

In this embodiment, vertically-aligned, multi-walled carbon nanotubes (CNT) were grown by chemical vapor deposition in a horizontal tube furnace with ethylene gas as the carbon-source. The CNTs were grown on a molybdenum- and oxide-coated silicon wafer, using aluminum and iron as catalyst layers.

Figure 3:
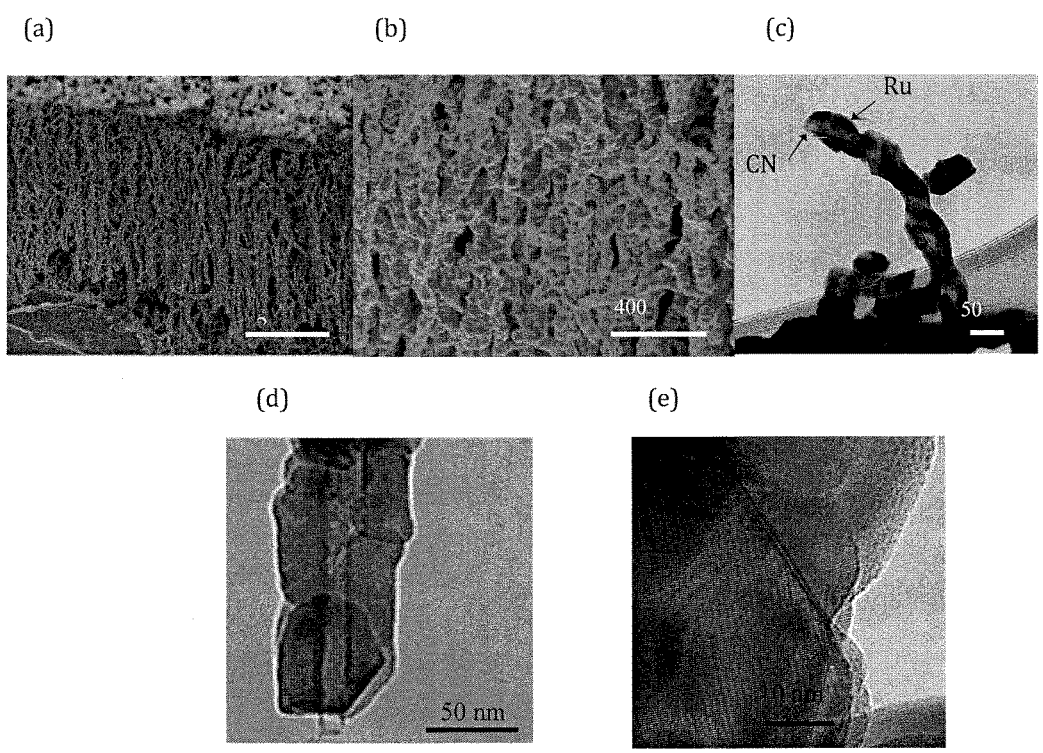
FIG. 3 Electron micrographs of $RuO_2$ coated carbon nanotubes.

ALD $RuO_x$ films were deposited by atomic layering deposition (ALD) on planar, vertically-aligned CNT using bis(ethylcyclopentadienyl)ruthenium(II) ($Ru(EtCp)_2$) as a $RuO_2$ precursor together with oxygen. FIG. 3a provides a scanning electron microscope (SEM) image of vertically aligned CNTs coated with ALD $RuO_2$. A cross-sectional scanning electron microscope (SEM) image of the $RuO_2$-coated CNTs found that the CNT forest is approximately 5 μm tall with large pore spaces available for the electrolyte to penetrate into the dense matrix of CNTs. A close-up SEM image (FIG. 3b) found that the CNTs were uniformly coated by the ALD process. The transmission electron microscope (TEM) image of a single CNT is shown in FIG. 3c where the ALD coated CNT was approximately 20 nm thick and demonstrated good adhesion to the CNT surface. In other (TEM) images of ALD $RuO_x$-coated CNTs, it was shown that the as-deposited films are polycrystalline (FIG. 3d) and highly conformal (FIG. 3e). SEM images were taken using an FEI Nova NanoSEM 650 scanning electron microscope and TEM images with a Technai 12 TEM.

The present methods developed using ALD with precursors and oxygen allowed for highly precise control over the $RuO_2$ layer thickness and composition without the use of binder molecules. ALD $RuO_x$ deposition was conducted in cycles using a Cambridge Fiji F200 Plasma ALD with bis(ethylcyclopentadienyl)ruthenium(II) ($Ru(EtCp)_2$) and oxygen ($O_2$) as precursors and argon carrier gas. Other metal precursors, using ruthenium as an illustration, include ruthenium cyclopentadienyl ($RuCp_2$), $Ru(od)_3$/n-butylacetate solution, bis(2,4-dimethylpentadienyl)ruthenium(II) ($Ru(DMPD)_2$), $Ru(thd)_3$, $Ru(EtCp)(DMPD)$, and (isopropylmethylbenzene)(cyclohexadiene)Ru. Water or hydrogen peroxide may substitute as oxidizing reactants for oxygen gas.

As an example, a cycle time included a pulse time for $Ru(EtCp)_2$ in an argon gas carrier for 1 to 5 seconds, waiting 1 to 10 seconds, purging 1 to 10 second with $O_2$, and waiting 1 to 10 seconds. ALD reaction temperatures were varied from 270° C. to 400° C. The number of cycles for layering $RuO_2$ varied from 50 to 1000 cycles.

Other embodiments of precursors for ALD fabrication include titanium dioxide ($TiO_2$): tetrakis(dimethylamino) titanium (TMDAT) or titanium tetrakis isopropoxide (TTIP) with oxygen or water; tin oxide ($SnO_2$) and tin tetrachloride ($SnCl_4$) and water; cobalt oxide ($Co_3O_4$): $Co(thd)_2$ and ozone; nickel oxide (NiO): $Ni(acac)_2$ and ozone; and iron oxide ($Fe_2O_3$, $Fe_3O_4$): ferrocene ($FeCp)_2$ and oxygen.

Figure 4:
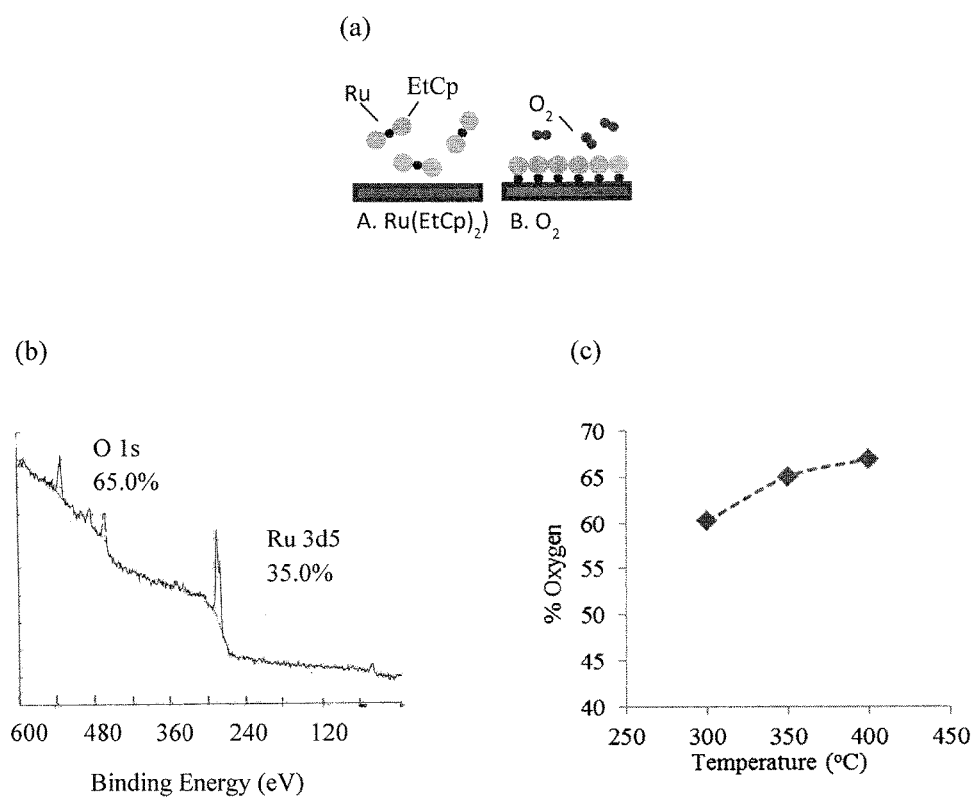
FIG. 4 Process and measurements of $RuO_2$ coated carbon nanotube films at different temperatures.

In one embodied process, ALD $RuO_2$ is deposited using ruthenium bis(ethylcyclopentadienyl) ($Ru(EtCp)_2$) and oxygen as precursors as illustrated in FIG. 4a. The novel two step cycle process included pulsing with $Ru(EtCp)_2$ in [A], followed by oxidation using $O_2$ [B], to convert $Ru(EtCp)_2$ to $RuO_2$ deposition, ensuring that Ru underwent controlled oxidation. With multiple successive cycles, the $RuO_2$ layers were controllably "grown" to the desired thickness. From grazing-incidence x-ray photoelectron spectroscopy (GIXPS) analyses, it was found that a deposition temperature of 300 to 400° C. achieved good $RuO_2$ deposition.

The composition of the ALD coating was investigated by GIXPS and XRD measurements. FIG. 4b showed the GIXPS spectrum for ALD $RuO_2$ deposited at 350° C. The results indicate a near-stoichiometric composition (65% 0, 35% Ru) within the GIXPS measurement range (top 10 nm of the film). FIG. 4c is a plot of the oxygen content of the ALD films measured by GIXPS as a function of deposition temperature. In the range of 300° C. to 400° C., higher deposition temperatures corresponded to increased oxygen content of the films. Materials characterization was done using a Siemens D5000 X-ray diffractometer (XRD), and a PHI 5400 X-ray photoelectron spectrometer (XPS) was used for glancing incident XPS (GIXPS) measurements.

The ALD process for $RuO_2$ is believed to occur via the accumulation of subsurface oxygen in a depositing Ru films. It is believed that with respect to the ALD growth mechanisms for Ru vs. $RuO_2$, several hundred deposition cycles of Ru are required before $RuO_2$ layers began to form. A certain thickness of Ru film is believed to be needed before there are enough defect sites to accumulate sufficient quantities of subsurface oxygen to form $RuO_2$. In the present embodiments, XRD measurements of ALD-$RuO_2$ films deposited at temperatures ranging from 300° C. to 400° C. showed primarily Ru diffraction peaks. For supercapacitor applications, only a surface layer of $RuO_2$ is needed for charge storage. The presence of an underlying Ru layer with good electrical conductivity would be beneficial to supercapacitor performance.

Figure 5:
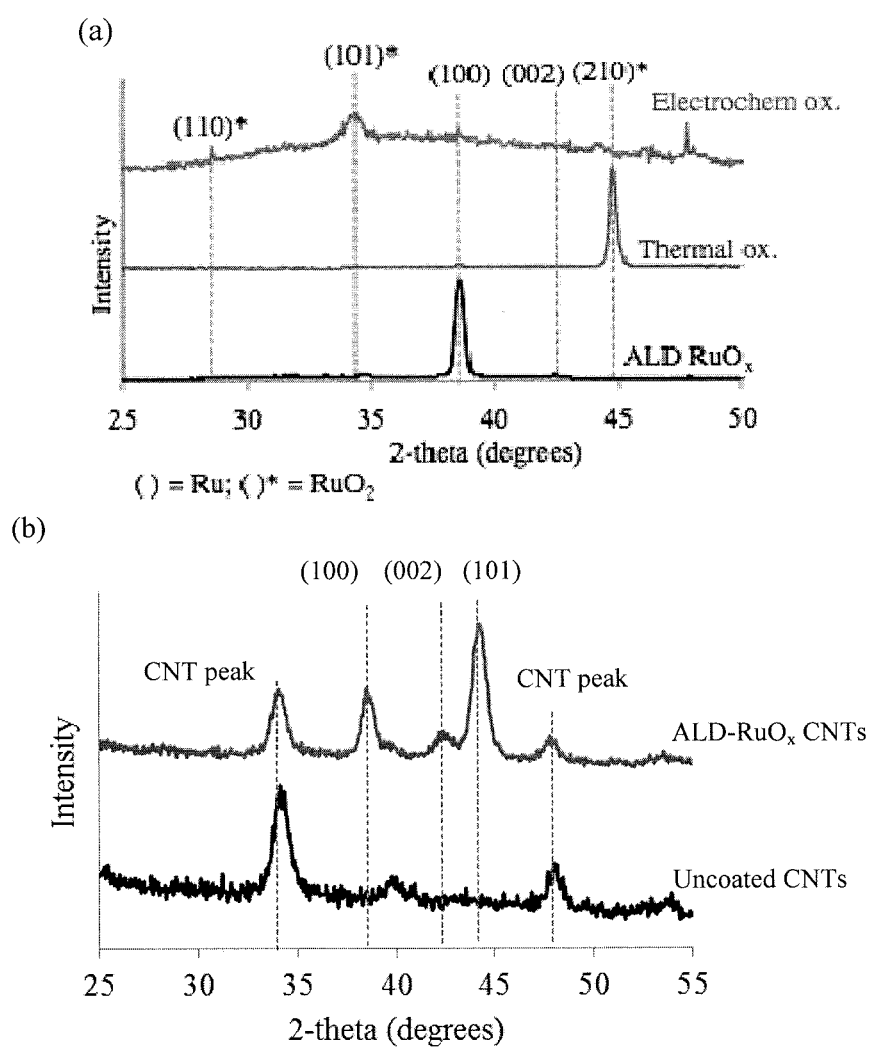
FIG. 5 X-ray diffraction measurements of ALD $RuO_x$-CNT electrodes.

X-ray diffraction (XRD) and X-ray photoelectron spectroscopy (XPS) measurements were used to characterize ALD $RuO_x$ films on vertically-aligned CNT substrates. Similar to ALD $RuO_x$ films deposited on planar substrates, XRD measurements for ALD films on CNTs show predominantly Ru peaks (FIG. 5a). High-resolution XPS measurements of the Ru3d peak for ALD $RuO_x$-films on CNTs show a shift to higher binding energies compared to Ru metal at take-off angles of 15°, 30°, and 75°, indicating the presence of oxidized ruthenium (FIG. 5b). High-resolution XPS measurements of the O 1s peak show the presence of $RuO_2$ (same as planar electrodes).

Figure 6:
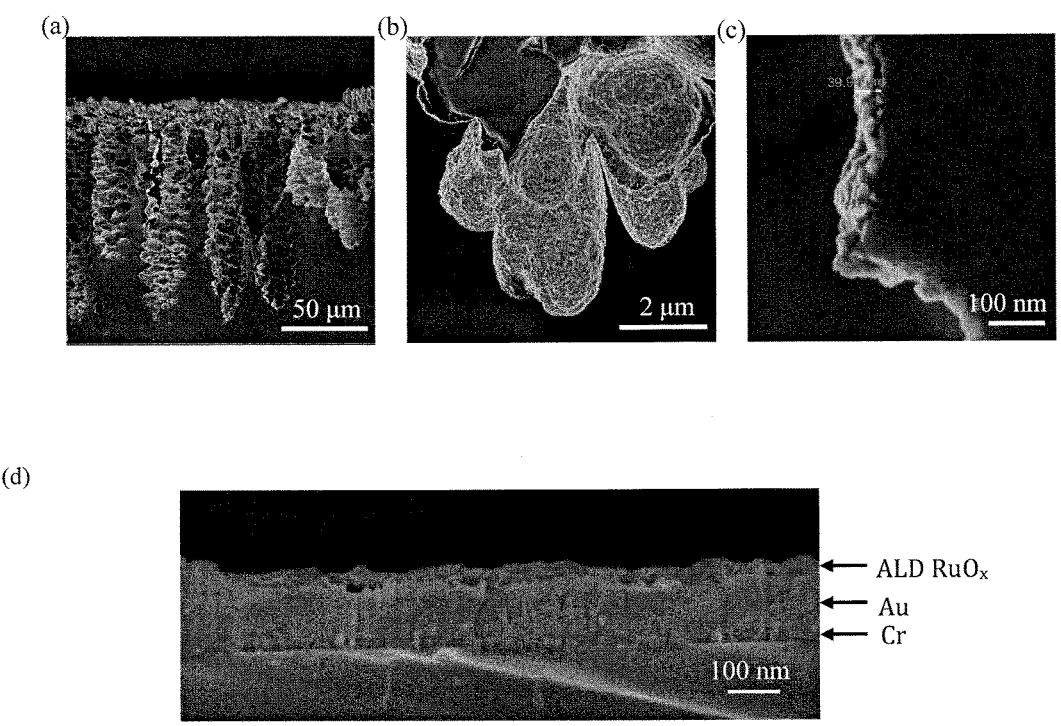
FIG. 6 SEM image of as-deposited ALD $RuO_x$ porous and planar Si supercapacitor electrode.

Example 3: ALD Layering of a Metal Oxide onto Planar and Porous Silicon Structures For porous Si electrodes, $RuO_x$ is deposited over the entire depth of the pores (exceeding 127 μm), however nucleation is less uniform than on CNTs. Previous studies of ALD $RuO_x$ have found that film nucleation efficiency depends on the substrate surface energy, with poorer nucleation expected on Si—H terminated surfaces like porous Si. ALD $RuO_x$ coating of planar supercapacitor electrodes is highly uniform and conformal, as expected. SEM images of ALD $RuO_x$ films deposited on porous Si is shown in FIG. 6a-c. In FIG. 6a, SEM image of as-deposited ALD $RuO_x$ porous Si supercapacitor electrode. The lighter regions of the pores are areas coated with $RuO_x$. In higher magnifications, SEM image of ALD $RuO_x$ conformally coating the bottom of a porous Si pore (FIG. 6b). In FIG. 6c, SEM image showing the thickness of the ALD $RuO_x$ coating on the porous Si electrode (40 nm).

For planar ALD $RuO_x$ supercapacitors, they were fabricated by depositing $RuO_x$ on a silicon substrate coated with 30 nm of chromium (Cr) and 70 nm gold (Au) by thermal evaporation. The chromium and gold layers were used to provide a better nucleation surface for ALD $RuO_x$ than pure silicon. The thickness of the ALD $RuO_x$ film was estimated from cross-sectional SEM images (FIG. 6d). The mass of as-deposited ALD $RuO_x$ films was calculated using the density of Ru metal (12.45 $g/cm^3$), as XRD measurements indicate that the as-deposited films are predominantly Ru. SEM images were taken using an FEI Nova NanoSEM 650 scanning electron microscope and TEM images with a Technai 12 TEM. XRD measurements were conducted with a Siemens D5000 X-Ray Diffractometer (Cu Kα radiation) and XPS measurements with a PHI Quantum 2000 X-ray photoelectron spectrometer with pass energies of 11 eV (monochromated Alk 1486.6 eV x-ray source). The uncertainty in high-resolution XPS these measurements is less than 0.2 eV.

As illustrated in the table below, the thickness of the film on planar silicon structure was readily adjusted depending on that desired, providing greater flexibility for its end use. In these embodiments, the planar ALD $RuO_x$ film thickness were measured and estimated of average mass per $cm^2$. In Column A, thin-film measurements of deposition are shown while in Column B those for thick-film are shown.

|  | A | B |
|---|---|---|
| Average film thickness | 36.7 nm | 151.2 nm |
| Number of film thickness measurements | 10 | 10 |
| Standard deviation | 3.7 nm | 16.2 nm |
| Average film mass | 0.046 $mg/cm^2$ | 0.19 $mg/cm^2$ |

Figure 7:
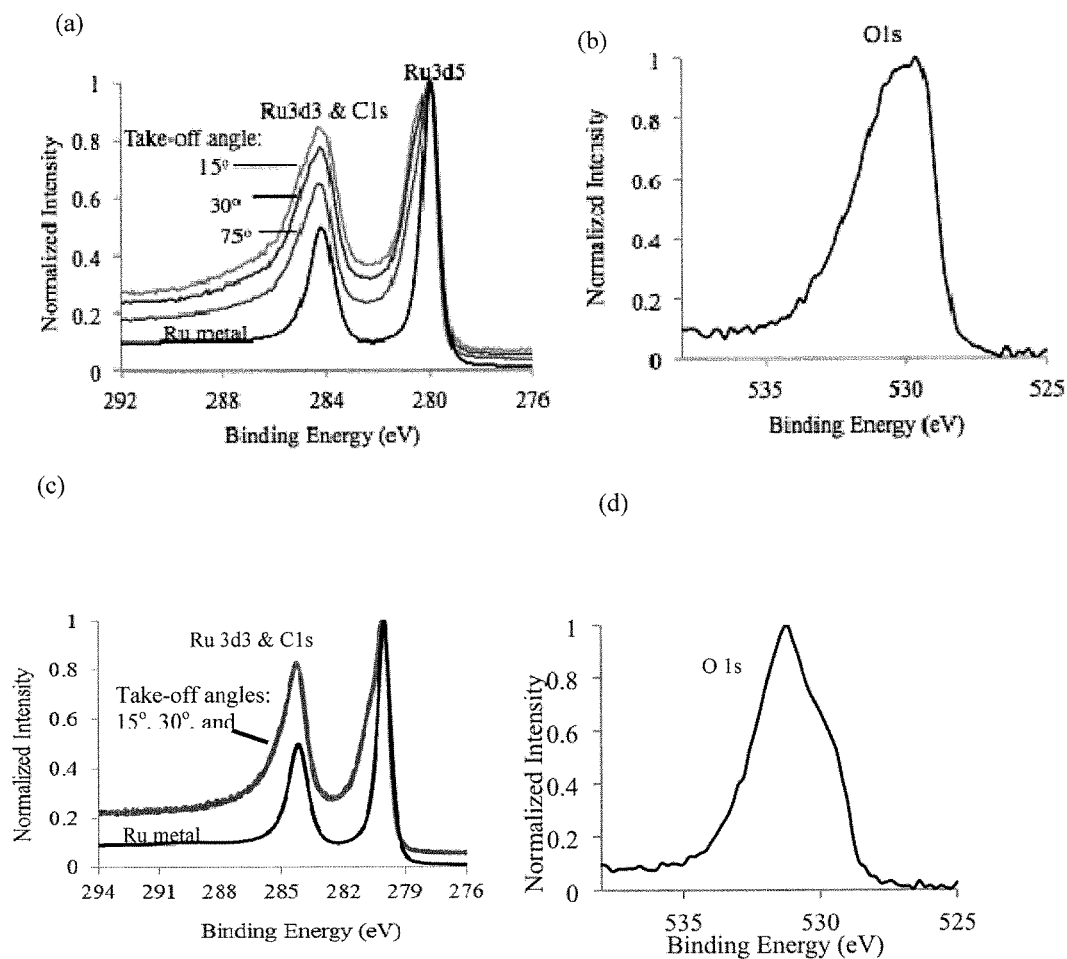
FIG. 7 High-resolution XPS measurements of binding energies for ALD $RuO_x$ planar and CNT films.

Following ALD $RuO_x$ deposition, X-ray diffraction (XRD) and X-ray photoelectron spectroscopy (XPS) measurements were performed to determine the composition of our ALD films. FIG. 7a-c showed XRD and XPS measurements of ALD films deposited on planar substrates that were similar to those for CNT electrodes shown elsewhere. XRD measurements of as-deposited ALD $RuO_x$ (FIG. 5a) show a strong metallic ruthenium crystal structure (Ru(100)), suggesting that the films are not fully oxidized during the ALD process. The role of the oxygen precursor during ALD $RuO_x$ deposition is both to oxidatively decompose the organometallic ruthenium precursor and to oxidize the depositing Ru metal film. Previous studies suggest that in-situ ALD $RuO_x$ formation can be inhibited by low rates of subsurface oxygen absorption and slow reaction kinetics for Ru oxidation. In this process, increasing the ALD $RuO_x$ deposition temperature from 270° C. to 400° C. changed the dominant Ru crystal phase, but does not produce $RuO_2$ XRD peaks.

XPS measurements provide qualitative characterization of a material's surface composition (approximately 1-10 nm film depth). XPS measurements of ALD $RuO_x$ films deposited on planar substrates reveal that the as-deposited films do have significant surface oxide character not detected by XRD. High-resolution XPS measurements of Ru 3d binding energies (FIG. 7a) show a shift to higher energies, and hence higher oxidation states, compared to Ru metal. For the O 1 s peak, we measured a binding energy of 530 eV for our as-deposited ALD $RuO_x$ films (FIG. 7b), consistent with previously reported results for $RuO_2$. Other forms of oxygen that may be present include Ru—OH and surface adsorbed $H_2O$; these materials, however, have O 1 s binding energies greater than 533 eV and are thus clearly distinguishable from $RuO_2$ given our high-resolution XPS measurement uncertainty of less than 0.2 eV. Ruthenium does not form a native oxide at room temperature, suggesting that the observed $RuO_2$ surface layer is formed during the ALD process.

Example 4: Supercapacitor Performance of ALD $RuO_2$-Coated CNTs

Figure 8:
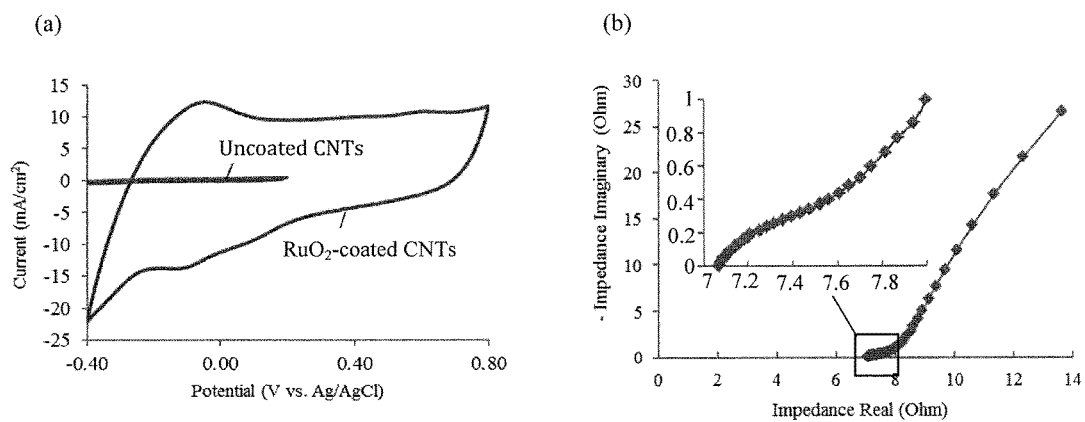
FIG. 8 Cyclic voltammetry and electrochemical impedance spectroscopy of ALD $RuO_2$ thermally and electrochemically oxidized electrodes.

When tested as a supercapacitor electrode, the ALD $RuO_2$-coated CNTs demonstrated high capacitive energy storage capability. Cyclic voltammetry measurements of the ALD $RuO_2$-coated CNT supercapacitor were compared to an uncoated ("bare") CNT supercapacitor. A capacitive current of 10 $mA/cm^2$ at a scan rate of 100 mV/s corresponds to specific capacitance of 100 $mF/cm^2$, which represents one of the best values in the literature. Measurements for cyclic voltammetry (CV) were conducted using a three-electrode test set-up, Ag/AgCl reference and Pt counter electrode and Gamry Reference 600 potentiostat, in 0.5 M $H_2SO_4$ aqueous electrolyte at 100 mV/s scan rate (though it should be appreciated that other acidic electrolytes may work such as, but not limited to, nitric acid (HNO3), hydrochloric acid (HCl), or the like may also and/or alternatively be used). The supercapacitor performance of the ALD $RuO_2$-CNTs is approximately fifty times that of the uncoated CNTs (FIG. 8a). The Nyquist plot in FIG. 8b shows that the device has an equivalent series resistance (ESR) of 7Ω, one of the lowest reported values. This low ESR value can be attributed to the conformal nature of the ALD coating which minimizes contact resistance between the active $RuO_2$ layer and the CNTs. In addition, rapid charge-discharge characteristics have been demonstrated and remained stable over time, as shown in FIG. 8b. It is expected that these results can be further improved upon by optimizing the stoichiometry and thickness of the $RuO_2$ coating. With the ALD fabrication method, these properties can be controlled with angstrom-level precision to achieve exceptionally high-performance supercapacitor devices.

Repeating chronoamperometry was used to measure the device response to a step-change in applied potential. The ALD-$RuO_2$ coated CNTs display rapid charge-discharge characteristics that remain remarkably stable over time.

These results demonstrated that ALD $RuO_2$-coated CNTs performed as excellent high-performance supercapacitor electrodes. In addition to high specific capacitance, the device has low equivalent series resistance, rapid charge-discharge characteristics, and good stability over repeated cycling. The exceptionally high-performance of the ALD $RuO_2$-coated CNTs can be attributed to: 1) excellent conformal coverage of the CNTs by the ALD $RuO_2$ coating, 2) a high-quality $RuO_2$ surface layer capable of fast, reversible redox reactions, and 3) high surface area of the dense, vertically-aligned CNT forest.

Example 5: ALD Supercapacitors Prepared by Post-Electrochemical Oxidation

To further enhance the supercapacitor performance of our ALD $RuO_x$ electrodes, as-deposited ALD films were electrochemically oxidized in 0.5 M $H_2SO_4$ electrolyte at a constant potential of 1.3 V vs. Ag/AgCl for variable amounts of time, 3 min-120 min, which corresponds to the electrochemical oxidation potential of Ru. For comparison, post-ALD thermal oxidation was conducted by heating as-deposited ALD $RuO_x$ electrodes to 600° C. in 70 sccm oxygen flow for 30 minutes. XRD measurements of electrochemically and thermally oxidized ALD $RuO_x$ planar films are shown in FIG. 5a. In contrast to as-deposited ALD films, both electrochemically and thermally oxidized films show evidence of $RuO_2$ crystal planes ($RuO_2$(210) for the thermally oxidized film, and a mixture of $RuO_2$(110)/$RuO_2$(101) for the electrochemically oxidized film). The electrochemically oxidized sample shows greater amorphous structure than the thermally oxidized electrode, as seen by the broad peak of the XRD measurements. The amorphous character of the electrochemically oxidized $RuO_x$ film may be due in part to its hydrated structure, with incorporated water molecules distorting the polycrystalline structure.

Example 6: Comparative ALD Supercapacitors Performance

Figure 9:
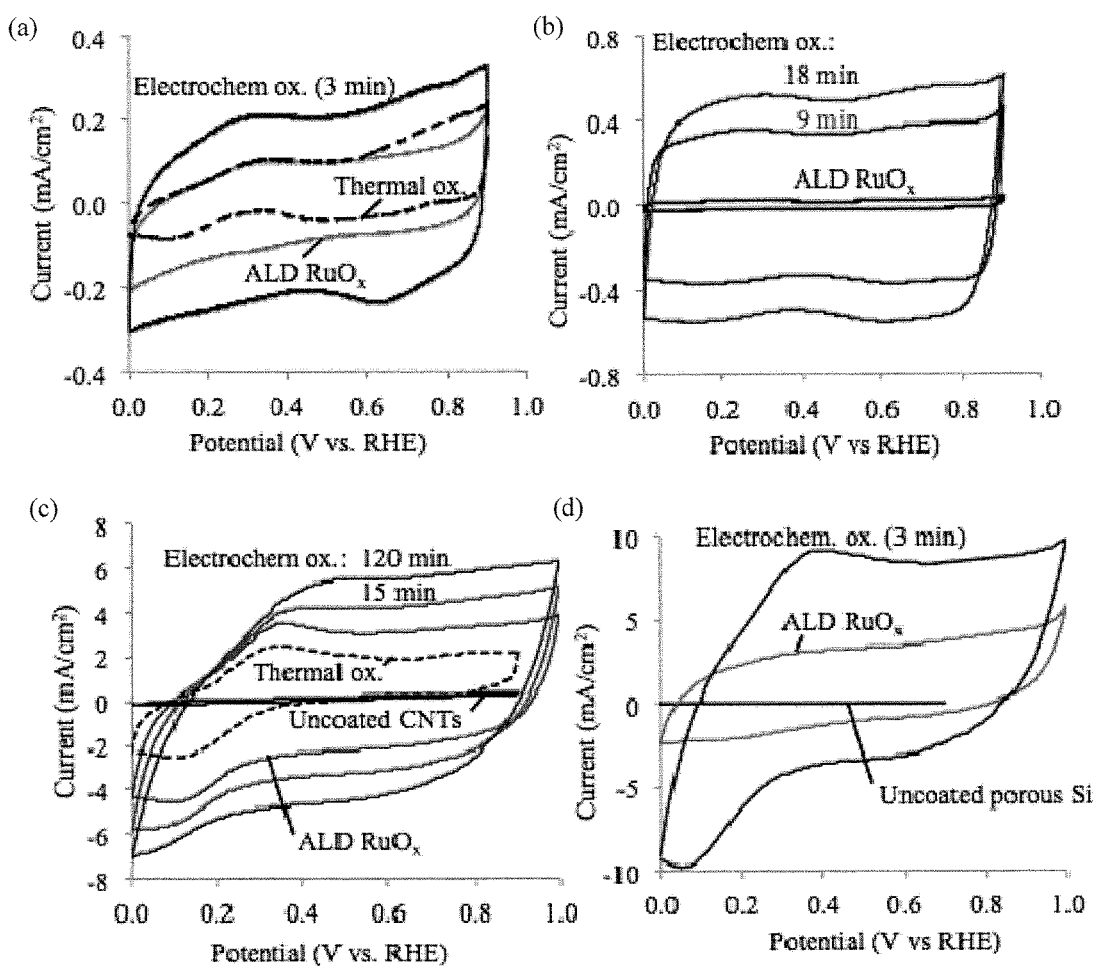
FIG. 9 Cyclic voltammetry measurements of ALD $RuO_x$ supercapacitors.

To determine the specific capacitance of thermally and electrochemically oxidized ALD $RuO_x$ supercapacitors, cyclic voltammetry (CV) measurements were performed using the three-electrode test set-up as previously described. A comparison of as-deposited ("ALD $RuO_x$"), thermally oxidized ("Thermal ox."), and electrochemically oxidized ("Electrochem ox.", with oxidation time) supercapacitors showed that electrochemical oxidation improved capacitance, while thermal oxidation decreases charge-storage ability compared to as-deposited ALD electrodes (FIG. 9). CV measurements for 40 nm and 150 nm thickness planar electrodes were compared to uncoated CNT (FIG. 10a) and uncoated porous Si (FIG. 10b) electrodes.

Figure 10:
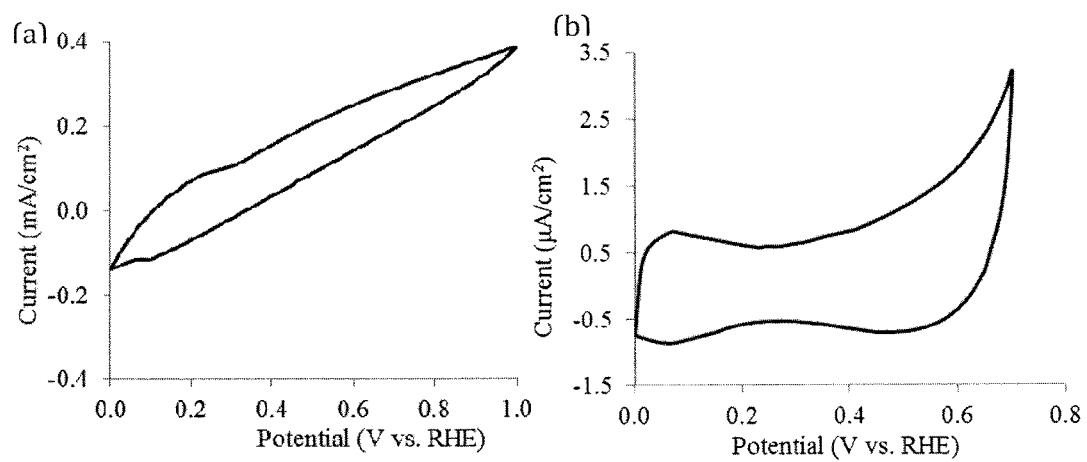
FIG. 10 Cyclic voltammetry measurements of uncoated CNT and porous Si electrodes.

Specific capacitance values shown in FIG. 10 were calculated from CV measurements. Methods were used to estimate the mass of ALD $RuO_x$-planar, porous Si, and CNT electrodes, specifically to calculate gravimetric specific capacitance, power, and energy density. Briefly, the mass of uncoated CNT electrodes was calculated from before and after mass measurements of CNT growth substrates. The mass of active porous Si electrode material from pore dimensions was estimated from SEM images. The mass of ALD $RuO_x$ films deposited on planar, porous Si, and CNT electrodes was estimated from thickness measurements of SEM and TEM images. In calculating $RuO_x$ mass, the density of Ru (12.45 $g/cm^3$) for as-deposited ALD $RuO_x$ films and the density of $RuO_2$ (6.97 $g/cm^3$) for electrochemically oxidized films (based on evidence of film composition from XRD measurements) were used.

CV measurements of ALD $RuO_x$ on planar, CNT, and porous Si substrates (FIG. 9a-d) show that the as-deposited ALD $RuO_x$ films are highly capacitive. The shape of the CV curves for as-deposited ALD $RuO_x$ electrodes is characteristic of $RuO_2$ supercapacitors reported. In this work, the highest values of specific capacitance are obtained with vertically aligned CNT electrodes due to their highly porous structure and large double layer capacitance. There was a two-order of magnitude an increase in specific capacitance for vertically aligned CNT electrodes with the ALD $RuO_x$ coating, from 3.4 F/g for uncoated CNTs (FIG. 10a) to 363 F/g for as-deposited ALD $RuO_x$-CNTs (404 F per gram of $RuO_x$). For porous Si electrodes, specific capacitance increases nearly 5000× with the ALD $RuO_x$ coating, from 0.39 mF/g for uncoated porous Si (FIG. 10b) to 1.88 F/g for ALD $RuO_x$-porous Si. This is the highest value of gravimetric specific capacitance reported for porous Si-based electrodes, which traditionally have received little consideration for supercapacitor applications due to their low intrinsic capacitance compared to carbon-based materials.

With post-ALD electrochemical oxidation, there was an increase in the specific capacitance of ALD $RuO_x$-coated planar, CNT, and porous Si electrodes (FIG. 9). The increased capacitance was found in the conversion of as-deposited, mixed metal-oxide ALD films to hydrated amorphous $RuO_x$ as confirmed by XRD measurements. After electrochemical oxidation, the specific capacitance of our ALD $RuO_x$-CNT supercapacitors reaches a maximum value of 644 F/g of $RuO_x$ (578 F/g including the mass of CNTs). For comparison, the theoretical capacitance of $RuO_2$ is 1450 F/g and the highest values reported in the literature range from 900 F/g-950 F/g. Optimization of supercapacitor electrode geometry, including both surface area and pore size, is critical to attaining high supercapacitor performance. In these embodiments, the ALD $RuO_x$-CNT electrodes achieved nearly 70% of the maximum $RuO_2$ capacitance reported to-date even without optimization of supercapacitor electrode geometry.

In contrast to electrochemical oxidation, thermal oxidation of ALD $RuO_x$ electrodes results in a decrease in supercapacitor performance under the conditions used. With thermal oxidation, the specific capacitance of planar and CNT electrodes dropped by 25% and 55% respectively compared to as-deposited ALD $RuO_x$ capacitance measurements.

Figure 11:
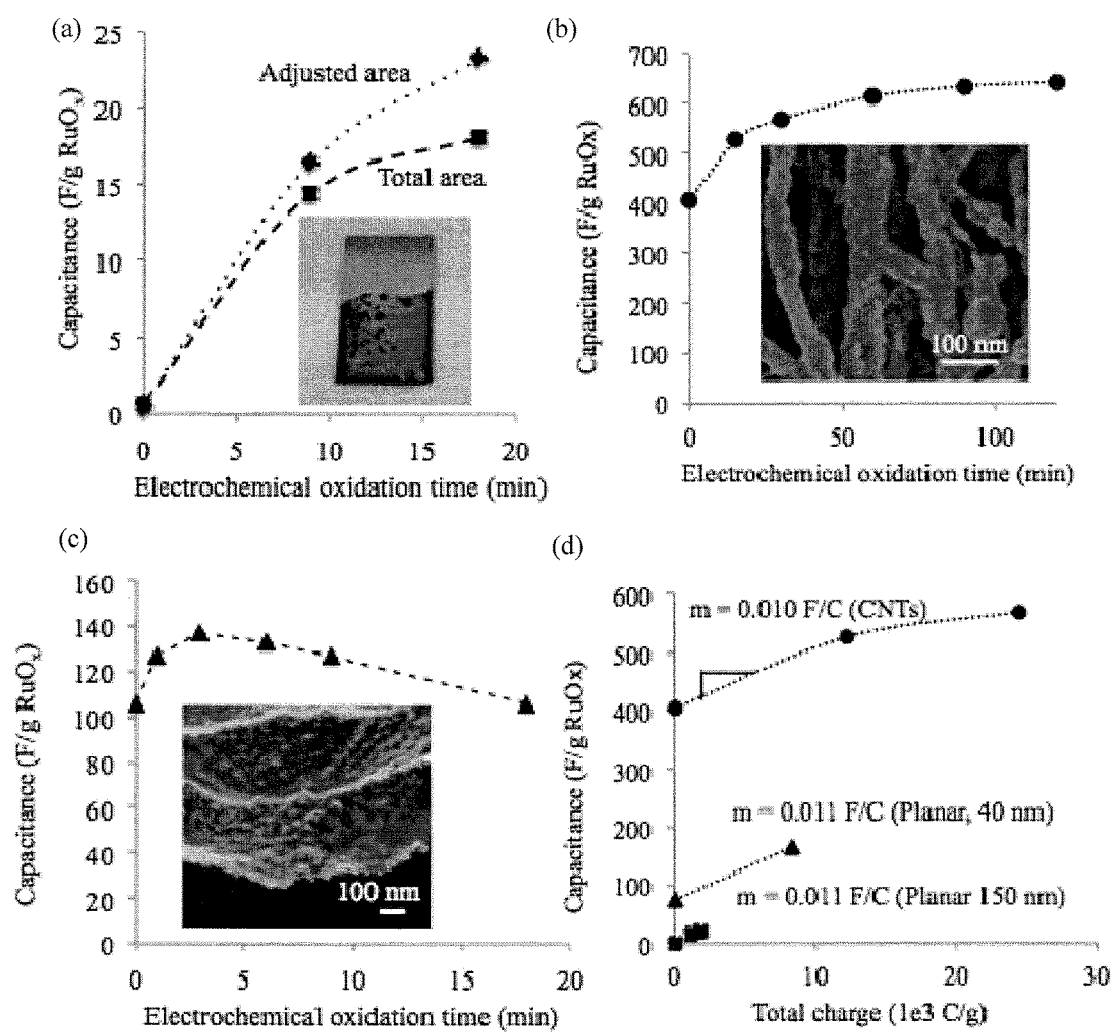
FIG. 11 Change in specific capacitance of ALD $RuO_x$ supercapacitors with electrochemical oxidation.

The effect of increasing electrochemical oxidation time on the specific capacitance of planar, CNT, and porous Si ALD $RuO_x$ supercapacitors is shown in FIG. 11. The capacitance of ALD $RuO_x$-CNT electrodes increases steadily over 120 minutes of electrochemical oxidation (FIG. 11b) while planar ALD 150 nm films start to delaminate after 5 minutes of oxidation (FIG. 11a) and porous Si electrodes experience a decrease in capacitance after 3 minutes of oxidation (FIG. 11c). These results are due to each electrode's ability to accommodate stresses in the ALD $RuO_x$ film arising from simultaneous oxidation and hydration processes. TEM images of ALD $RuO_x$-coated CNTs before and after 9 minutes of electrochemical oxidation show a 35% increase in $RuO_x$ thickness. For porous Si electrodes, a substantial degradation of both the ALD $RuO_x$ film and porous Si substrate after 18 minutes of electrochemical oxidation was found. In contrast, vertically aligned CNTs have a high degree of mechanical flexibility that can accommodate substantial increases in $RuO_x$ coating thickness without visible degradation.

Example 7: ALD Supercapacitors Scan Rate & Life Cycle Performance Testing

Figure 12:
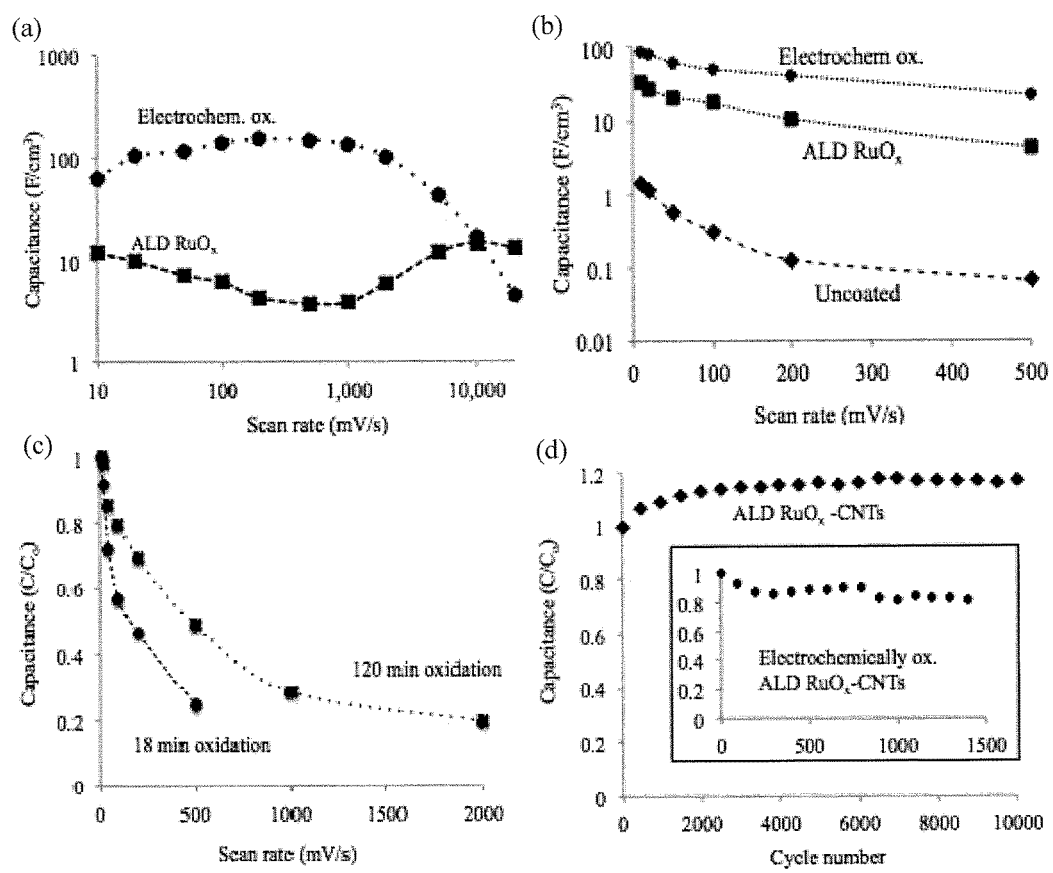
FIG. 12 Scan rate and life cycle performance testing of ALD $RuO_x$ supercapacitors.

ALD $RuO_x$ electrodes were tested over a range of CV scan rates to characterize supercapacitor performance at different charging speeds (FIG. 12a-c). Planar, as-deposited ALD $RuO_x$ electrodes exhibited exceptional capacitance retention at high scan rates, maintaining the same specific capacitance at 10 mV/s and 20 V/s (FIG. 6a). To our knowledge, 20 V/s is one of the fastest scan rates reported in the literature for $RuO_x$ supercapacitors. As shown in FIG. 12c, increasing the oxidation time of ALD $RuO_x$-CNT electrodes from 18 minutes to 120 minutes enabled the supercapacitors to maintain 20% of their 10 mV/s specific capacitance value at a scan rate of 2 V/s. This enhanced performance at higher scan rates is thought to result from improved proton conductivity and hence faster redox reactions in the electrochemically oxidized ALD $RuO_x$ films.

In FIG. 12d, life cycle performance testing results are shown for as-deposited and electrochemically oxidized ALD $RuO_x$-CNT electrodes. Life cycle testing was conducted by repeated CV scans over the full supercapacitor operating range (0-1.0 V vs. RHE). Remarkably, the specific capacitance of as-deposited ALD $RuO_x$-CNTs increased by 20% after 10,000 CV cycles. The improved performance improvement is likely due to the gradual, non-reversible electrochemical oxidation of as-deposited ALD $RuO_x$ during the CV. Similarly, planar ALD $RuO_x$ also had a capacitance increase with repeated cycling. Electrochemically oxidized ALD $RuO_x$-CNTs tested over repeated charge-discharge cycles show a 19% decrease in specific capacitance.

According to one aspect, the present disclosure features a method to a fabricate high surface area, high performance supercapacitor. The method may include applying a metal layer to at least a portion of a nanostructure; after applying the metal layer, oxidizing the metal layer; applying a plurality of additional metal layers onto a previously oxidized metal layer; and after applying each additional metal layer, oxidizing the additional metal layer prior to applying a successive additional metal layer. The metal layers may include a composition comprising at least one metal, the at least one metal selected from the group consisting of ruthenium, titanium, manganese, vanadium, iron, tin, cobalt and nickel.

Optionally, each of the additional metal layers is applied using atomic layering deposition (ALD). For example, each of the additional metal layers may include a metal oxide or a metal precursor, and the step of applying the additional metal layers includes using ALD to pulse the metal layer. The ALD may be used to pulse the additional metal layers in a carrier gas at a temperature between 270° C. to 400° C. The pseudocapacitive metal precursor layer may be selected from the group consisting of bis(ethylcyclopentadienyl), cyclopentadienyl, $(od)_3$/n-butylacetate solution, bis(2,4-dimethylpentadienyl)ruthenium(II), $(thd)_3$, (EtCp)(DMPD), and (isopropylmethylbenzene)(cyclohexadiene).

Optionally, the method may further include a step of electrochemically oxidizing at least one of the oxidized additional metal layers. For example, the step of electrochemically oxidizing the at least one oxidized additional metal layers may include using an acidic electrolyte. The electrochemically oxidizing may be performed for 3 to 120 minutes at a constant potential (1.3 V versus Ag/AgCl) using controlled potential coulometry.

The step of oxidizing the additional metal layers may include oxidizing the additional metal layers with oxygen, water, and hydrogen peroxide. The nanostructure may be selected from the group consisting of linear, non-linear, planar or porous nanostructures. For example, the nanostructure may include a substrate composed of materials selected from the group consisting of carbon, silicon, graphene, activated carbon, and phosphorene. The nanostructure also optionally further include a conductive layer disposed on the substrate. The conductive layer may be selected from the group consisting of molybdenum, iron, aluminum, chromium and gold.

According to another aspect, the present disclosure features another method to a fabricate high surface area, high performance supercapacitor. The method includes using atomic layering deposition (ALD) to apply a metal precursor layer to a portion of a nanostructure; after applying the metal precursor layer, oxidizing the metal precursor layer; applying a plurality of additional metal precursor layers onto a previously oxidized metal precursor layer; and after applying each additional metal precursor layer, oxidizing the additional metal precursor layer prior to applying a successive additional metal precursor layer to form a layer of a pseudocapacitive material disposed about at least a portion of the nanostructure.

Optionally, the method further includes the step of electrochemically oxidizing at least one of the oxidized additional metal precursor layers. For example, the step of electrochemically oxidizing the at least one oxidized additional metal precursor layers may include using an acidic electrolyte. The electrochemically oxidizing may be performed for 3 to 120 minutes at a constant potential (1.3 V versus Ag/AgCl) using controlled potential coulometry.

The metal precursor layer may be selected from the group consisting of bis(ethylcyclopentadienyl), cyclopentadienyl, $(od)_3$/n-butylacetate solution, bis(2,4-dimethylpentadienyl)ruthenium(II), $(thd)_3$, (EtCp)(DMPD), and (isopropylmethylbenzene)(cyclohexadiene).

Optionally, the nanostructure may be selected from the group consisting of linear, non-linear, planar or porous nanostructures. For example, the nanostructure may include a substrate composed of materials selected from the group consisting of carbon, silicon, graphene, activated carbon, and phosphorene. The nanostructure may optionally further include a conductive layer disposed on the substrate. The conductive layer may be selected from the group consisting of molybdenum, iron, aluminum, chromium and gold.

According to yet another aspect, the present disclosure features a high performance supercapacitor. The high performance supercapacitor may include a nanostructure; a first metal layer formed on at least a portion of the nanostructure, and at least one pseudocapacitive material layer formed over at least a portion of the first metal layer. The first metal layer may be formed on the at least a portion of the nanostructure by applying a metal precursor layer onto a nanostructure using atomic layering deposition (ALD) and thereafter oxidizing the metal precursor layer. The at least one pseudocapacitive material layer may be formed by applying an additional metal precursor layer onto a previously oxidized metal precursor layer and thereafter oxidizing the additional metal precursor layer prior to applying a successive additional metal precursor layer.

Optionally, the metal precursor layer may be selected from the group consisting of bis(ethylcyclopentadienyl), cyclopentadienyl, $(od)_3$/n-butylacetate solution, bis(2,4-dimethylpentadienyl)ruthenium(II), $(thd)_3$, (EtCp)(DMPD), and (isopropylmethylbenzene)(cyclohexadiene). According to one embodiment, the additional metal precursor layers are applied and oxidized for 50 to 1000 cycles. Additionally (or alternatively), at least a portion of an outer surface of the at least one pseudocapacitive material layer may be electrochemically oxidized.

Further aspects of the present disclosure will be brought out in the following portions of the specification, wherein the detailed description is for the purpose of fully disclosing preferred embodiments of the invention without placing limitations thereon.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A method to a fabricate high surface area, high performance supercapacitor, said method comprising:
   forming a plurality of conductive, porous nanostructures on a substrate, said plurality of conductive, porous nanostructures extending from said substrate and forming a plurality of electrodes of said supercapacitor;
   applying a metal layer to at least a portion of said plurality of conductive, porous nanostructure electrodes;
   after applying said metal layer, oxidizing said metal layer;
   applying a plurality of additional metal layers onto a previously oxidized metal layer; and
   after applying each additional metal layer, oxidizing said additional metal layer prior to applying a successive additional metal layer;
   wherein said metal layers includes a composition comprising at least one metal, said at least one metal selected from the group consisting of ruthenium, titanium, manganese, vanadium, iron, tin, cobalt and nickel.

2. The method of claim 1, wherein each of said additional metal layers is applied using atomic layering deposition (ALD).

3. The method of claim 2, wherein each of said additional metal layers includes a metal oxide or a metal precursor, and wherein said step of applying said additional metal layers includes using ALD to pulse said metal layer.

4. The method of claim 1, further comprising a step of electrochemically oxidizing at least one of said oxidized additional metal layers.

5. The method of claim 4, wherein said step of electrochemically oxidizing said at least one oxidized additional metal layers includes using an acidic electrolyte.

6. The method of claim 5, wherein electrochemically oxidizing said at least one oxidized additional metal layers is performed for 3 to 120 minutes at a constant potential, said constant potential is 1.3 V versus Ag/AgCl using controlled potential coulometry.

7. The method of claim 2, wherein said ALD is used to pulse said additional metal layers in a carrier gas at a temperature between 270° C. to 400° C.

8. The method of claim 3, wherein said pseudocapacitive metal precursor layer is selected from the group consisting of bis(ethylcyclopentadienyl), cyclopentadienyl, $(od)_3$/n-butylacetate solution, bis(2,4-dimethylpentadienyl)ruthenium (II), $(thd)_3$, (EtCp)(DMPD), and (isopropylmethylbenzene)(cyclohexadiene).

9. The method of claim 1, wherein oxidizing said additional metal layers comprises oxidizing said additional metal layers with oxygen, water, and hydrogen peroxide.

10. The method of claim 1, wherein said plurality of porous, conductive nanostructures are selected from the group consisting of vertically aligned carbon nanotubes (CNT) or planar silicon.

11. The method of claim 1, wherein the plurality of porous, conductive nanostructures comprise a substrate composed of materials selected from the group consisting of carbon, silicon, graphene, activated carbon, and phosphorene.

12. The method of claim 11, wherein the plurality of porous, conductive nanostructures further comprise a conductive layer disposed on said substrate, said conductive layer selected from the group consisting of molybdenum, iron, aluminum, chromium and gold.

13. A method to a fabricate high surface area, high performance supercapacitor, said method comprising:
forming a plurality of conductive, porous nanostructures on a substrate, said plurality of conductive, porous nanostructures extending from said substrate and forming a plurality of electrodes of said supercapacitor;
using atomic layering deposition (ALD) to apply a metal precursor layer to a portion of said plurality of conductive, porous nanostructure electrodes;
after applying said metal precursor layer, oxidizing said metal precursor layer;
applying a plurality of additional metal precursor layers onto a previously oxidized metal precursor layer; and
after applying each additional metal precursor layer, oxidizing said additional metal precursor layer prior to applying a successive additional metal precursor layer to form a layer of a pseudocapacitive material disposed about at least a portion of said nanostructure.

14. The method of claim 13, further comprising a step of electrochemically oxidizing at least one of said oxidized additional metal precursor layers.

15. The method of claim 14, wherein said step of electrochemically oxidizing said at least one oxidized additional metal precursor layers includes using an acidic electrolyte.

16. The method of claim 15, wherein electrochemically oxidizing said at least one oxidized additional metal precursor layers is performed for 3 to 120 minutes at a constant potential, said constant potential is 1.3 V versus Ag/AgCl using controlled potential coulometry.

17. The method of claim 13, wherein said metal precursor layer is selected from the group consisting of bis(ethylcyclopentadienyl), cyclopentadienyl, $(od)_3$/n-butylacetate solution, bis(2,4-dimethylpentadienyl)ruthenium(II), $(thd)_3$, (EtCp)(DMPD), and (isopropylmethylbenzene)(cyclohexadiene).

18. The method of claim 13, wherein said plurality of porous, conductive nanostructures are selected from the group consisting of vertically aligned carbon nanotubes (CNT) or planar silicon.

19. The method of claim 13, wherein the plurality of porous, conductive nanostructures comprise a substrate composed of materials selected from the group consisting of carbon, silicon, graphene, activated carbon, and phosphorene.

20. The method of claim 19, wherein the plurality of porous, conductive nanostructures further comprise a conductive layer disposed on said substrate, said conductive layer selected from the group consisting of molybdenum, iron, aluminum, chromium and gold.

21. A method to a fabricate high surface area, high performance supercapacitor, said method comprising:
forming a plurality of conductive, porous carbon nanotubes (CNTs) on a substrate, said plurality of conductive, porous CNTs extending from said substrate and forming a plurality of electrodes of said supercapacitor;
applying a metal layer to at least a portion of said plurality of conductive, porous CNTs using atomic layering deposition (ALD);
after applying said metal layer, oxidizing said metal layer;
applying a plurality of additional metal layers onto a previously oxidized metal layer using ALD; and
after applying each additional metal layer, oxidizing said additional metal layer prior to applying a successive additional metal layer;
wherein said metal layers includes a composition comprising at least one metal, said at least one metal selected from the group consisting of ruthenium, titanium, manganese, vanadium, iron, tin, cobalt and nickel.

22. The method of claim 21, wherein each of said additional metal layers includes a metal oxide or a metal precursor, and wherein said step of applying said additional metal layers includes using ALD to pulse said metal layer.

23. The method of claim 22, wherein said pseudocapacitive metal precursor layer is selected from the group consisting of bis(ethylcyclopentadienyl), cyclopentadienyl, $(od)_3$/n-butylacetate solution, bis(2,4-dimethylpentadienyl) ruthenium(II), $(thd)_3$, (EtCp)(DMPD), and (isopropylmethylbenzene)(cyclohexadiene).

24. The method of claim 21, further comprising a step of electrochemically oxidizing at least one of said oxidized additional metal layers using an acidic electrolyte for 3 to 120 minutes at a constant potential, wherein said constant potential is 1.3 V versus Ag/AgCl using controlled potential coulometry.

* * * * *